(12) United States Patent
Futch et al.

(10) Patent No.: US 11,501,246 B1
(45) Date of Patent: Nov. 15, 2022

(54) SERVER AND RELATED METHOD FOR MANAGING PARCEL DELIVERY

(71) Applicant: Tompkins Robotics, Inc., Raleigh, NC (US)

(72) Inventors: Michael C. Futch, Raleigh, NC (US); James M. Serstad, Orlando, FL (US)

(73) Assignee: Tompkins Robotics, Inc., Raleigh, NC (US)

( * ) Notice: Subject to any disclaimer, the term of this patent is extended or adjusted under 35 U.S.C. 154(b) by 729 days.

(21) Appl. No.: 16/197,261

(22) Filed: Nov. 20, 2018

Related U.S. Application Data

(60) Provisional application No. 62/588,862, filed on Nov. 20, 2017.

(51) Int. Cl.
 *G06Q 10/08* (2012.01)
 *G05D 1/00* (2006.01)
 *G06V 20/62* (2022.01)

(52) U.S. Cl.
 CPC ..... *G06Q 10/08355* (2013.01); *G05D 1/0088* (2013.01); *G06V 20/63* (2022.01); *G05D 2201/0216* (2013.01)

(58) Field of Classification Search
 CPC ........... G06Q 10/08355; G05D 1/0088; G05D 2201/0216; G06K 9/3258
 USPC ......................................................... 705/338
 See application file for complete search history.

(56) References Cited

U.S. PATENT DOCUMENTS

| | | | |
|---|---|---|---|
| 5,971,587 A | * | 10/1999 | Kato .................. B07C 3/00 700/226 |
| 6,895,301 B2 | | 5/2005 | Mountz |
| 7,402,018 B2 | | 7/2008 | Mountz et al. |
| 7,826,919 B2 | | 11/2010 | DAndrea et al. |
| 7,912,574 B2 | | 3/2011 | Wurman et al. |
| 7,991,505 B2 | | 8/2011 | Lert, Jr. et al. |
| 8,280,547 B2 | | 10/2012 | DAndrea et al. |

(Continued)

FOREIGN PATENT DOCUMENTS

| | | |
|---|---|---|
| CN | 105929740 A | 9/2016 |
| CN | 206661696 U | 11/2017 |

(Continued)

OTHER PUBLICATIONS

"Planning Paths for Package Delivery in Heterogeneous Multirobot Teams" Published by IEEE Transactions on Autonomous Science and Engineering (Year: 2015).*

*Primary Examiner* — Zeina Elchanti
(74) *Attorney, Agent, or Firm* — Parthiban A Mathavan

(57) ABSTRACT

Server for use in directing a mail element or package delivery is configured for determining if a mail element or package is destined for a location inside a local market or outside the local market, wherein the local market includes a plurality of post offices within a distance from a post office where the mail element or package initially arrives upon, and wherein a route determination is executed by sorting the mail element or package with an automated or robotic machine directed by the server. When the mail element or package is destined for a location inside the local market, the server directs transport of the mail element or package to a destination post office within the local market. When the mail element or package is destined for a location outside the local market, the server directs transport of the mail element or package to a regional center.

14 Claims, 3 Drawing Sheets

(56) References Cited

U.S. PATENT DOCUMENTS

| | | |
|---|---|---|
| 8,639,382 B1 | 1/2014 | Clark et al. |
| 8,718,814 B1 | 5/2014 | Clark et al. |
| 9,010,517 B2 | 4/2015 | Hayduchok et al. |
| 9,037,286 B2 | 5/2015 | Lert |
| 9,067,744 B2 | 6/2015 | Takizawa et al. |
| 9,152,149 B1 | 10/2015 | Palamarchuk et al. |
| 9,317,034 B2 | 4/2016 | Hoffman et al. |
| 9,342,811 B2 | 5/2016 | Mountz et al. |
| 9,346,620 B2 | 5/2016 | Brunner et al. |
| 9,436,184 B2 | 9/2016 | DAndrea et al. |
| 9,600,798 B2 | 3/2017 | Battles et al. |
| 9,802,759 B2 | 10/2017 | Lert, Jr. |
| 9,855,586 B2 | 1/2018 | Chirol et al. |
| 9,950,863 B2 | 4/2018 | OBrien et al. |
| 2004/0073333 A1 | 4/2004 | Brill |
| 2007/0065258 A1 | 3/2007 | Benedict et al. |
| 2007/0071585 A1 | 3/2007 | Henkel |
| 2011/0046775 A1* | 2/2011 | Bailey ............... G06Q 50/28 700/224 |
| 2011/0208626 A1* | 8/2011 | Carpenter ........... G06Q 30/04 705/30 |
| 2012/0290125 A1 | 11/2012 | Perry |
| 2018/0039282 A1 | 2/2018 | Gupta et al. |
| 2018/0111808 A1 | 4/2018 | Hoeltgen et al. |
| 2018/0275680 A1 | 9/2018 | Gupta et al. |
| 2019/0064785 A1 | 2/2019 | Wurman et al. |
| 2020/0156256 A1* | 5/2020 | Park ................... G05D 1/0212 |

FOREIGN PATENT DOCUMENTS

| | | |
|---|---|---|
| CN | 107458828 A | 12/2017 |
| EP | 1590272 B1 | 8/2010 |

\* cited by examiner

SERVER AND RELATED METHOD FOR MANAGING PARCEL DELIVERY

CROSS-REFERENCE TO RELATED APPLICATIONS

This application claims priority to U.S. Provisional Patent Application No. 62/588,862 filed on Nov. 20, 2017, the entire contents of which is incorporated by reference herein.

TECHNICAL FIELD

This disclosure relates to a server, system, and related method for managing mail element and package delivery.

BACKGROUND

Centrally located mail element and package sorting systems typically involve transporting packages received at a package receiving office to a regional sorting center so as to realize unified sorting of mail elements and packages prior to shipment to each of their ultimate destinations. The regional sorting center receives mail elements and packages arriving from a plurality of mail element and package receiving locations, sorts the mail elements and packages, and dispatches the sorted mailed elements and packages for delivery through a delivery vehicle. This procedure has the benefit of unified consolidation at a single processing location. However, this procedure may result in a mail element or package with a delivery destination juxtaposed or otherwise close to the mail element or package receiving office being shipped all the way to the regional sorting center, get sorted at the regional sorting center only to be dispatched for delivery back to the delivery destination juxtaposed to the mail element or package receiving office that originally received the mail element or package, thereby introducing inefficiencies in the delivery process including an unnecessary delay in the delivery of the mail element or package.

Accordingly, a need exists for a solution to overcome such problems.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a server for use in directing a mail element or package delivery operation, the server having a memory and a processor and configured for determining if a mail element or package is destined for a location inside a local market or outside the local market, wherein the local market includes a plurality of post offices within a distance from a post office where the mail element or package initially arrives upon, and wherein a route determination is executed by sorting the mail element or package with an automated or robotic machine directed by the server. When the mail element or package is destined for a location inside the local market, the server is configured for directing transport of the mail element or package to a destination post office within the local market. When the mail element or package is destined for a location outside the local market, the server is configured for directing transport of the mail element or package to a regional center.

According to one or more embodiments, the determination is made by imaging a destination address or identifier of the mail element or package.

According to one or more embodiments, the imaging is compared with a database that corresponds to the plurality of post offices.

According to one or more embodiments, the imaging is compared with a database that corresponds to a plurality of street addresses associated with the plurality of post offices.

According to one or more embodiments, the destination post office is the post office in which the determination is made.

According to one or more embodiments, when the mail element or package is destined for a location within the local market, the server is configured to determine a destination address for the mail element or package, and assign a route for delivery of the mail element or package based on the destination address for additional mail elements or packages.

According to one or more embodiments, the transport to the destination post office within the local market is made with a delivery vehicle.

According to one or more embodiments, the regional center services areas outside of the local market.

According to one or more embodiments, the server includes a parcel sequencing engine configured to optimize a delivery sequence of the mail element or package relative to other mail elements or packages to be delivered along same delivery route.

According to one or more embodiments, the determination is made based on one or more of: delivery route optimization, delivery vehicle characteristic optimization, sorting crew work shift optimization, delivery vehicle driver work shift optimization, minimization of postal worker hours, maximization of postal worker route delivery hours, delivery distance optimization, delivery time optimization, delivery route fuel usage optimization, time of day optimization, traffic optimization, network carbon footprint optimization, total network cost optimization, and mail element or package condition optimization.

Disclosed herein is a server for use in directing a delivery operation, the server configured for, at a local market for an item delivery operation, determining a destination of a mail element or package at a first local office of the local market, and assigning a route for delivery of the mail element or package within the service area of a second local office of the local market, wherein the mail element or package is sorted to the assigned route by an automated or robotic machine at the first local office containing the mail element or package. The server is further configured for sequencing mail elements or packages or the location of additional mail elements or packages on the route delivery vehicle for delivery within the route based on the sorting of the mail element or package and the additional mail elements or packages such that all route mail elements or packages are known and immediately accessible by the driver with no searching or uncertainty.

According to one or more embodiments, the determination is made by imaging of a destination address or identifier of the mail element or package.

According to one or more embodiments, the imaging is compared with a database that corresponds to a plurality of street addresses associated with the plurality of local offices of the local market.

According to one or more embodiments, the server includes a parcel sequencing engine configured for sequencing delivery of the mail element or package and the additional mail elements or packages such as to achieve one or more of: delivery route optimization, delivery vehicle characteristic optimization, sorting crew work shift optimization, delivery vehicle driver work shift optimization, minimization of postal worker hours, maximization of postal worker route delivery hours, delivery distance optimization, delivery time optimization, delivery route fuel usage optimization, time of day optimization, traffic optimization, network carbon footprint optimization, total network cost optimization, and mail element or package condition optimization.

According to one or more embodiments, the mail element or package includes a farm produce.

According to one or more embodiments, the route assignment is based on a shipping rate associated with the mail element or package.

Disclosed herein is a method of directing a mail element or package delivery operation, comprising determining if a mail element or package received at a first local office of a local market is destined for a location inside a local market or outside the local market, wherein the local market includes a plurality of local offices within a predefined distance from the first local office where the mail element or package initially arrives upon, and wherein a route determination is executed by sorting the mail element or package with an automated or robotic machine directed by the server. When the mail element or package is destined for a location inside the local market, directing transport of the mail element or package to a second local office of the local market, and when the mail element or package is destined for a location outside the local market, directing transport of the mail element or package to a regional center.

According to one or more embodiments, the method further comprises imaging a destination address or identifier of the mail element or package; and comparing the imaging with a database that corresponds to a plurality of street addresses associated with the plurality of local offices.

According to one or more embodiments, when the mail element or package is destined for a location within the local market, the method further comprises determining a destination address for the mail element or package, and assigning a route for delivery of the mail element or package based on the destination address for additional mail elements or packages.

According to one or more embodiments, the determination is made based on one or more of: delivery route optimization, delivery vehicle characteristic optimization, sorting crew work shift optimization, delivery vehicle driver work shift optimization, minimization of postal worker hours, maximization of postal worker route delivery hours, delivery distance optimization, delivery time optimization, delivery route fuel usage optimization, time of day optimization, traffic optimization, network carbon footprint optimization, total network cost optimization, and mail element or package condition optimization.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION OF THE EMBODIMENTS

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The present invention will be further described with reference to the accompanying drawings:

The present invention relates to a delivery management system. According to advantageous aspects of the present invention, the time for delivery for local mail elements and packages is reduced, labor associated with handling is reduced, and overall shrinkage and product damage rates are reduced; in addition, the cost savings associated with these aspects are realized. The present invention advantageously results in a local market network having reduced staffing, reduced vehicle moves, and reduced resource utilization including reduced fuel consumption, all the while improving the accuracy of delivery and minimizing instances of sorting parcels to incorrect routes or destinations.

Figure 1:
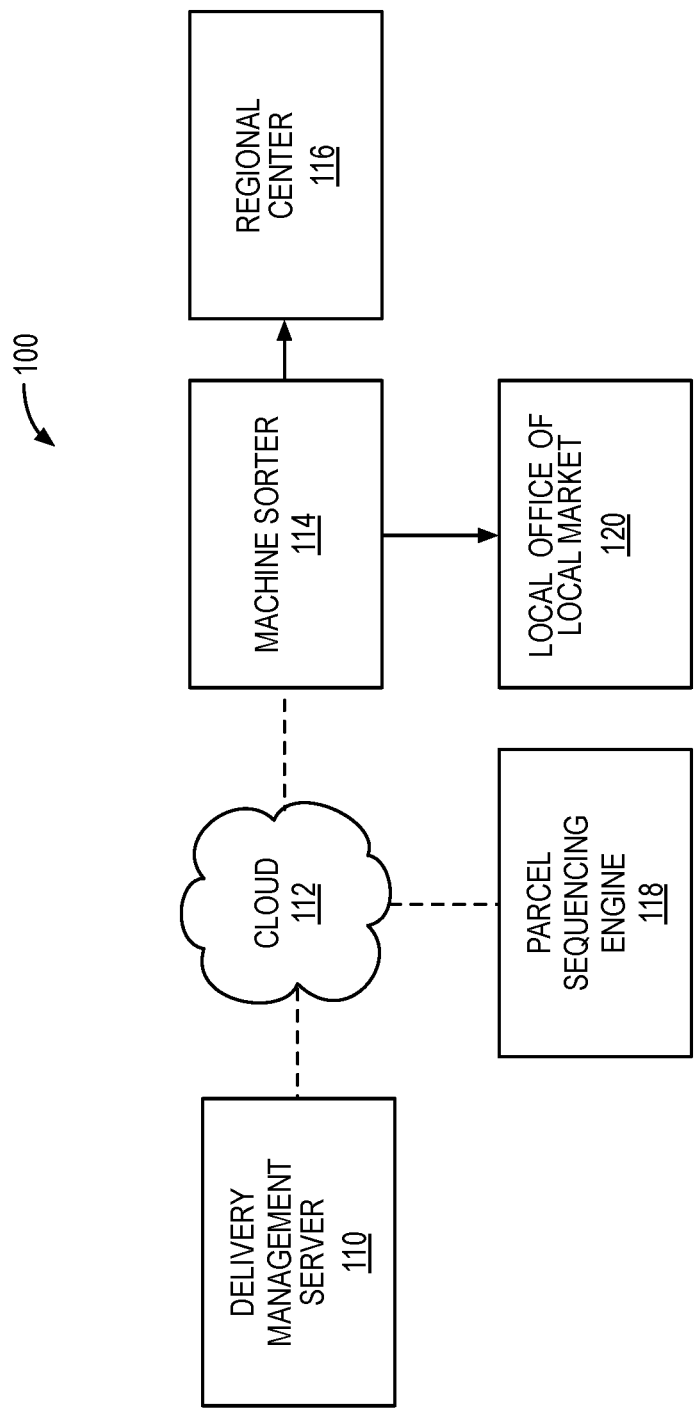
FIG. 1 is a schematic structural diagram of a delivery management system according to one or more embodiments of the present invention.
Figure 2:
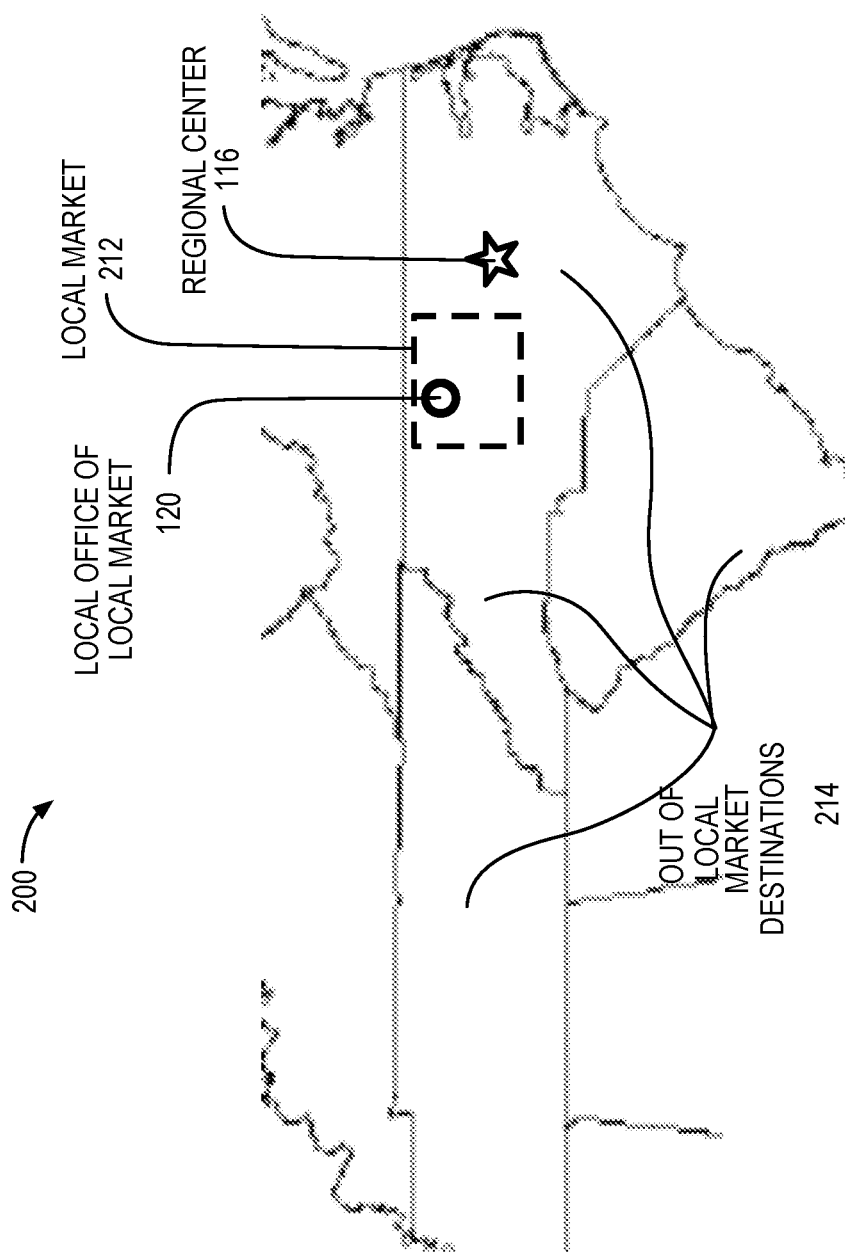
FIG. 2 is a schematic structural diagram of an implementation of the delivery management system within a geographical distribution area according to one or more embodiments of the present invention.

FIG. 1 illustrates a delivery management system 100 (alternately referred to herein as "system 100" or generally as "system") according to one or more embodiments disclosed herein. The system 100 includes various components, some of which are depicted in a representative manner as blocks representing a generic descriptor of the technology. The system 100 may include more or less components than those illustrated. In one embodiment, system 100 includes a delivery management server 110 configured for communicating with one or more components of system 100 as described herein, and as shown, for example, in FIG. 1. In one embodiment, delivery management server 110 includes memory, a processor, and/or one or more communication interfaces. A network is illustrated by lines and arrows connecting the blocks; the network may take on any appropriate form, including a wireless, WLAN, cellular, hard wire, etc., and combinations thereof. Delivery management server 110 (alternately referred to as "server 110" or generally as "server") communicates over the network with a cloud infrastructure such as cloud 12 as illustrated in FIG. 1. Cloud 112 may further communicate with a parcel sequencing engine 118 and with a machine sorter 114. The machine sorter 114, on the hand, may be in communication with one or more regional centers 116 as well as with one or more local offices 120 of a local market 212 (local market 212 is illustrated in FIG. 2). In one embodiment, machine sorter 114 is provided for sorting mail elements, parcels or packages (machine sorter may alternately be referred to herein as "machine" or as "sorter"). Machine sorter 114 is configured for sorting mail elements, parcels or packages by imaging or otherwise interrogating an image or other identifier of a mail element or package to determine a destination thereof. Machine sorter 114 may then sort and use a plurality of robots to deposit mail elements and packages into appropriate bins or containers, including bins or containers that are marked for specific routes in a local market, and into those bins or containers marked for out of local market delivery as will be described further herein. In one embodiment, machine sorter 114 cooperates with the delivery management server 110, wherein delivery management server 110 determines if a given mail element, parcel or package is destined for a location within local market 212 or an out of local market destination 214. Herein, the term package as used herein includes a mail element, a mail item, a parcel or any tangible item that is to be delivered to a destination address after being sorted at a processing facility.

In some embodiments, the machine sorter may be the one or more machines illustrated and described in PCT Patent Application No. PCT/US18/46460 filed on Aug. 13, 2018, and entitled "Mobile Sorter Platforms and methods for sorting articles," U.S. patent application Ser. No. 15/455,094 filed on Mar. 9, 2017, and entitled "Parcel and Article Sorting System and Method," and in U.S. patent application Ser. No. 15/455,099 filed on Mar. 9, 2017, and entitled "Parcel Sorting System and Method," the contents of which are hereby incorporated by reference herein in their entirety.

An illustration of one example of a geographical distribution area 200 serviced by the delivery management system 100 will now be explained with reference to FIG. 2. As illustrated in FIG. 2, within a geographical distribution area 200, a local market 212 may be a collection of addresses, zip codes, municipalities, direct delivery units (DDUs), or a predefined area bounded by a boundary line that can be serviced by one or more local offices 120 within a local market 212 without having to send a mail element or package bound for local delivery to a destination within the contours of local market 212 unnecessarily to a regional center 204. In one embodiment, local office(s) 120 may represent a local post office(s). While embodiments of the invention are being described herein with reference to a postal delivery operation such as that may be in vogue at the US Postal System (USPS), the invention is in no way limited only to a postal operation. The present invention may advantageously be applied to all instances involving sorting and delivery of mail elements and packages wherein delivery optimization by a delivery management system as described herein may result in overall reduction in the use of resources associated with the sorting and delivery operation.

In various embodiments, the local market 212 may alternately be defined by any reasonable metric, which may be time dependent or variable depending on a variety of factors. For example, in periods of time where a fewer number of mail elements or packages are being delivered ("slower periods"), the local market 212 can be expanded to encompass a wider area thereby including adjacent regions not already serviced as a "local market", during "regular periods", i.e., periods of time where a regular number of mail elements or packages are being delivered. In another example, a first local market 212 may be allowed to overlap over an adjacent second local market 212 in periods of peak demand. The local market 212 may additionally evolve and change based on changing demographics related to population growth or the like. In some embodiments, the determination as to what constitutes a local market 212 is done based on a real time optimization algorithm residing on or executing on the delivery management server 110. In some embodiments, the optimization is focused further on reducing the volume of mail elements or packages being handled by a stressed regional center 204 in to optimize costs, labor, transportation availability and other similar process requirements at the stressed regional center 204. In some embodiments, the optimization furthermore takes into account the costs, labor, transportation and process requirements of the entire network of regional centers 116 and local offices 120, while still meeting the delivery time requirements of all mail elements or packages handled by the system.

The out of local market destinations 214 (alternately referred to as "out-of-local market" areas) as illustrated in FIG. 2 may represent an entirety of space beyond the local market 120 in one embodiment. In various embodiments, one or more regional centers 204 are provided for separating, sorting and preparing for transit and delivery, mail elements and packages received at the regional center 204, with the out of local market destinations 214 being serviced by one or more regional centers 116.

The implementation of various embodiments of the present invention will now be discussed by contrasting the same to a conventional system of mail element sorting and package sorting performed by an exemplary postal operation in some postal applications. Under the conventional method followed in an exemplary postal operation, the route taken by a mail element and package traveling within the same local market may proceed as follows:

i. Postal driver picks up a mail element or package at a mail element and parcel accumulation box or parcel collection point, e.g., a packet left outside a house or office for pick up—day 1 ii. Driver reaches a first local post office, wherein the mail element or package is added to other mail elements or packages from other routes that services by the same local post office; the mail element or package (along with the other mail elements and packages) is put on a delivery vehicle heading to a bulk mail sort center typically located in the nearest metro area—day 1 iii. The mail element or package is processed at the bulk mail sort center, loaded onto a delivery vehicle heading back to a second local post office in the same local market area as the first local post office (the mail element or package does not go to another bulk mail sort center)—day 2 iv. The mail element or package gets to the appropriate post office that services the destination address of the mail element or package, is hand sorted to the correct route, and loaded on the appropriate postal route truck—day 3 v. Delivered by driver at the destination address—day 3

In one embodiment employing the delivery management system 100 as described herein, the time taken for delivering certain mail elements and packages may advantageously be reduced, by implementing the following approach:

i. Postal driver picks up a mail element or package at a mail element and parcel accumulation box or parcel collection point, e.g., a packet left outside a house or office for pick up—day 1 ii. Driver reaches a first local post office, wherein the mail element or package is scanned by the delivery management system 100 and sorted at the local post office by an automated sortation system and accumulated with other mail elements and packages destined for other local post offices in the local market 212 and to one or more regional centers 16 in the region of the country (for example, regional center 116 as shown in FIG. 2 may service the Southeast US region)—day 1.

iii. For a mail element or package to be delivered to a second local post office in the same local market 212 as the first local post office, the mail element or package is sorted to the end destination post office, put on a postal route truck and transferred to that end destination post office. Illustrative examples of a mail element or package being transported between two post offices located within a same local market 212 include (a) transportation from Wake Forest, N.C. to Cary, N.C., (b) transportation from the Bronx, NYC, N.Y. to the Financial District, NYC, N.Y., and (c) transportation from Pasadena, Calif. to Long Beach, Calif. The mail element or package accordingly avoids the trip to and from the closest regional center 116 as well as the associated handling at that center—day 1 iv. The mail element or package gets to the final delivery post office that services the destination address of the mail element or package, is sorted automatically to the final delivery route, and then loaded on the appropriate postal route delivery truck—day 2 v. Delivered by driver at the destination address—day 2

As the above comparison makes clear, embodiments of the present invention may advantageously shave off one day from the time taken to deliver a mail element or package.

Typical delivery methods currently being used operate such that all mail elements and packages leaving a local post office automatically head to the next level bulk mail sort center. This means that a mail element or package destined to an address within the local market 212 may nonetheless be first shipped to a regional sort center (e.g., regional center 116 shown in FIG. 2), then to another regional center in some instances (or alternately to another post office that does not cover the destination address of the mail element or package), and then to the final post office that delivers the mail element or package to the destination location.

In a further embodiment employing the delivery management system 100 as described herein, the time taken for delivering certain mail elements and packages may advantageously be reduced even further as described below:

i. Mail elements and packages are run through machine sorter 114 by the delivery management system 100 in the backroom of a local post office and sorted to multiple locations (instead of all the received mailed elements and packages being shipped automatically to a regional center 116 for sorting). The delivery management system 100 sorts the incoming mail elements and packages to multiple regional centers 116 or to other local post offices within the same local market 212.

ii. First level of sortation is accomplished at the local post office 120 that picked up the mail elements and packages or had them hand-deposited therein, thus advantageously reducing overall volume at regional centers 116. Furthermore, the first level sortation being performed at the local post office 120 reduces traffic between local post office(s) 120 and the regional center(s) 116.

1. If the parcel is destined for a delivery location that is within the service area of the local post office 120 that initially receives the incoming mail element or package, it will be sorted by the delivery management system 100 the next morning to a route local to that local post office 120. In this manner, the mail element or package is never delivered to a regional center 116. Accordingly, the mail element or package is advantageously delivered within 1 day of the initial pick-up of the mail element or package.

2. If the mail element or package is destined for a delivery location within the local market 212 but not served by the local post office that initially receives the incoming mail element or package, the mail element or package will be sorted by the delivery management system 100 to a group of mail elements and packages destined for each local post office 120 located within local market 212. Delivery management server 110 is also configured to prepare delivery instructions for each local post office 120 within local market 212 that is equipped with a route truck. In this manner, the mail element or package is never delivered to a regional center 116. Accordingly, the mail element or package is advantageously delivered within 1 to 2 days of the initial pick-up of the mail element or package.

3. If the mail element or package is destined to a location close to an intermediate facility (different from regional center 116) located within a predetermined distance (for example, within 250 miles) from the local post office 120 that initially receives the incoming mail element or package, delivery management system 100 sorts the mail element or package to be delivered to that intermediate facility; this action effectively eliminates at least one regional center 116 from the overall flow, saving time and costs.

Figure 3:
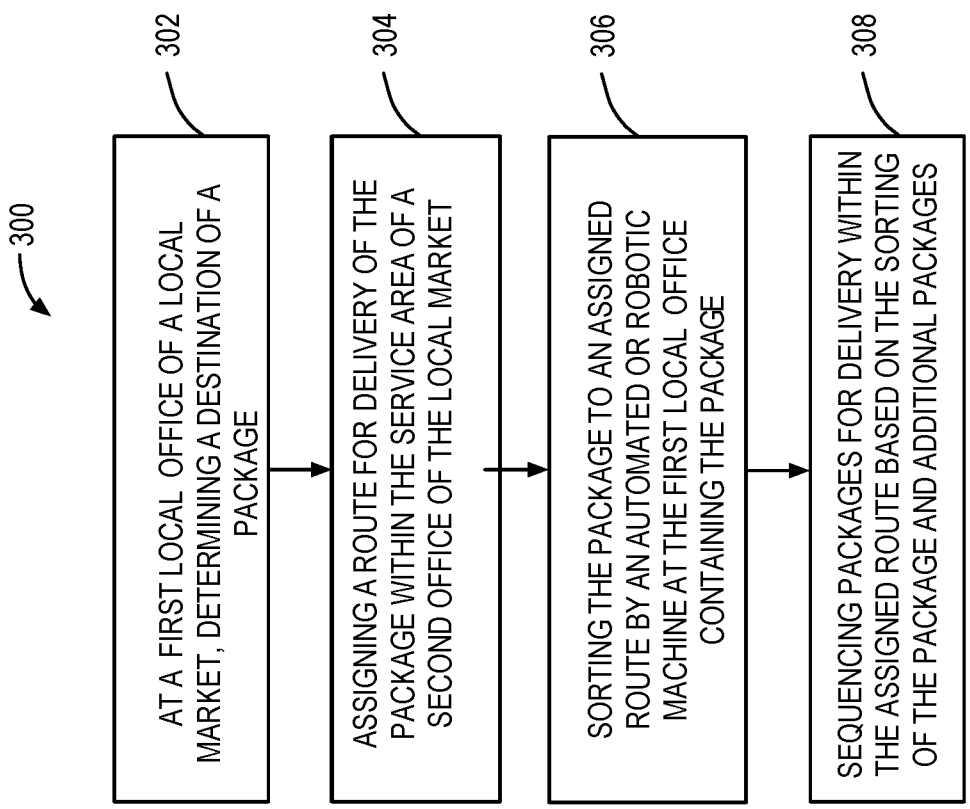
FIG. 3 is a flow chart illustrating steps associated with the delivery management system according to one or more embodiments of the present invention.

FIG. 3 illustrates a flow chart 300 depicting the steps associated with the operations of the delivery management system 100, according to one embodiment of the invention. In step 302, the system 100 operating at a first local office of a local market determines a destination of a mail element or package. In one embodiment, the first local office represents local office 120 and the local market represents local market 212, both as illustrated in FIG. 2, for example. In step 304, the system 100 assigns a route for delivery of the mail element or package within the service area of a second office of the same local market 212 as the first local office. In step 306, the system 100 sorts the mail element or package to an assigned route by an automated or robotic machine at the first local office containing the mail element or package; in one embodiment, system 100 uses machine sorter 114 to accomplish this. At step 308, the system 100 sequences mail elements and packages for delivery within the assigned route based on the sorting of the mail element or package and additional mail element and/or packages.

In one embodiment, server 110 determines if a mail element or package is destined for a location inside a local market 120 or outside the local market. In one example, the local market includes a plurality of post offices within a distance from a post office where the mail element or package initially arrives upon. The server 100 determines a route for delivery of the mail element or package by sorting the mail element or package with an automated or robotic machine directed by the server 110. When the server 110 determines that the mail element or package is destined for a location inside the local market 120, the server 110 directs transport of the mail element or package to a destination post office within the local market 212. Alternately, if the server 110 determines that the mail element or package is destined for a location outside the local market, the server 110 directs transport of the mail element or package to a regional center 116. In one embodiment, the determination of whether the mail element or package is destined for a location inside the local market 120 is made at the destination post office that services the delivery address of the mail element or package. In one embodiment, when the mail element or package is destined for a location outside the local market, server 110 directs transport of the mail element or package to one of a plurality of regional centers. In one embodiment, the imaging of a destination address or identifier of the mail element or package is compared with a database that corresponds to the plurality of post offices in the local market as well as post offices that reside outside the local market and are identified with a primary regional center, which in one embodiment is one of a plurality of regional centers.

In one embodiment, after the server 110 makes the determination that the mail element or package is destined for a location within the local market 212, the server 110 further determines a destination address for the mail element or package, and assigns a route for delivery of the mail element or package based on the destination address of additional mail elements and packages that need to be delivered within local market 212. In one embodiment, the server 110 includes the parcel sequencing engine 118 configured to optimize a delivery sequence of the mail element or package relative to other mail elements and packages to be delivered along same delivery route. In an alternate embodiment, the parcel sequencing engine 118 is a component separate from server 110 within the delivery management system 110. In one embodiment, parcel sequencing engine 118 is configured to optimize a delivery sequence of the mail element or package relative to other mail elements and packages to be delivered along same delivery route.

In one embodiment, the transportation of the mail element or package to the destination post office within local market 212 is made by a delivery vehicle. In one embodiment, the regional center 116 services areas outside of local market 212; stated differently, the region center 116 services out of local market destinations 214.

According to another embodiment, server 110 for use in directing a delivery operation is configured to perform the following functions. The server 110 located at a local market for an item delivery operation, determines a destination of a mail element or package at a first local office of the local market. The server 110 then assigns a route for delivery of the mail element or package within the service area at the singular local office that receives and delivers the mail element or package or at a second local office of the local market when the server 110 determines that the destination location of the mail element or package is within the same local market 120 as the first local office. The first and second local offices in this instance may be any location or facility wherein a mail element or package to be delivered arrives. The server 110 sorts the mail element or package to the assigned route by an automated or robotic machine at the first local office containing the mail element or package. The server 110 further sequences mail elements and packages or the location of additional mail elements and packages on the route delivery vehicle for delivery within the route based on the sorting of the mail element or package and the additional mail elements and packages such that all route mail elements and packages are known and immediately accessible by the driver of the delivery vehicle with no searching or uncertainty.

In a further embodiment, a method of directing a mail element or package delivery operation executed by the delivery management server 110 proceeds as follows. The server 100 determines if a mail element or package received at a first local office 120 of a local market 212 is destined for a location inside a local market 212 or outside the local market 212 (i.e., destined for an out of local market destination 214 as illustrated in FIG. 2), wherein the local market 212 including a plurality of local offices within a predefined distance from the first local office 120 where the mail element or package initially arrives upon, wherein a route determination is executed by sorting the mail element or package with an automated or robotic machine directed by the server 110. When the server 110 determines that the mail element or package is destined for a location inside the local market, the server 110 directs transport of the mail element or package to a second local office 120 within the same local market 212. Alternately, when the server 110 determines that the mail element or package is destined for a location outside the local market 212 (i.e., destined for an out of local market destination 214 as illustrated in FIG. 2), the server 110 directs transport of the mail element or package to a regional center 116.

Accordingly, in some embodiments, when there the destination of the mail element or package is not located within local market 212, the delivery management system 100 may not automatically ship the mail element or package to regional center 116 when there is resource savings to be realized by instead shipping the mail element or package to an intermediate facility located closer to the receiving local post office 120 than the regional center 116; instead, the system 100 may ship the mail element or package to the intermediate facility, which then sorts the mail element or package and transports it the local post office 120 that services the mail element or package destination address. This local post office 120 may then deliver the mail element or package to the destination to thereby optimize use of resources thereby saving time and costs.

According to advantageous aspects of the present invention, a specific mail element or package received at a local office may not automatically be shipped off to the regional center 116 if and when delivery management system 100 makes a determination that the specific mail element or package is destined for a location inside the local market 212; at the same time, for other mail elements and packages not destined for a location inside the local market 212, delivery management system 100 may additionally determine an optimum transportation route to be traversed by such other mail elements and packages such that time and other resources associated with their transportation are optimized. In some instances, it may mean shipping the other mail elements and packages to a regional center 116; in some other instances, it may mean shipping the other mail elements and packages to an intermediate regional facility different from regional center 116 local within a predetermined distance from the local post office 120 that initially receives the incoming mail element or package.

In various embodiments of the present invention, the system 100 is provided with a parcel sequencing engine 118 for optimizing the transportation of a mail element or package to its delivery destination. In one embodiment, as part of the optimization, parcel sequencing engine 118 may determine the number of mail elements and packages within the local market, and then determine the end delivery route for each mail element or package. The parcel sequencing engine 118 may also sequence the placement of mail element or packages on a delivery vehicle in such a way as to most efficiently deliver the mail elements and packages. For example, in one embodiment, the parcel sequencing engine 118 arranges the mail items and packages in the delivery vehicle in the reverse sequence as the delivery locations occur as the route is traversed by the delivery vehicle. In one embodiment, parcel sequencing engine 118 may also provide data for routing, in addition to pre-mapping, based on mail element or package data transmitted from online accounts; for example, parcel sequencing engine 118 may provide data for routing and pre-mapping based on mail element or package data transmitted from online accounts that indicate that a plurality of inter-local market mail elements and packages are being shipped on a single day, or that a plurality of mail elements and packages with a same local post office destination are being shipped on a given day. In one embodiment, parcel sequencing engine 118 uses historical data such as seasonality, shipments through day of the week, and similar other features in beginning to sequence the mail elements and packages by their respective routes. In one embodiment, parcel sequencing engine 118 may further calculate cubic volume and other characteristics of parcels for a particular route which may then be used by a route optimization system to further improve the efficiency of delivery.

In one embodiment, the parcel sequencing engine 118 may optimize the route to be taken by a delivery vehicle from the sorting facility to the destination of the mail element or package. In one example, optimization of the delivery route to reduce the total resources allocated for the delivery of a mail element or package may mean routing the mail element or package to the regional center even when the engine 118 makes a determination that the mail element or package is to be delivered to a location within the local market. This may be due various reasons. For example, this determination may result from the engine 118 making a determination that the destination post office (or local office) would not be staffed or would be under-staffed over the next couple of days. In another embodiment, this determination may result from the engine 118 making a determination that the destination post office would not be staffed or would be under-staffed over the next couple of days. In another embodiment, the determination may be made on the basis that the capacity of delivery vehicles stationed at the regional center is not adequate to fulfill the delivery requirements. For example, there might be a temporary change in the geographic distribution of deliveries because a certain area within a region is experiencing a particularly high volume of online purchasing due to local promotions, in which case some of the volume may be shifted from the local office to the regional office to complete deliveries in that area. Likewise, volume could be shifted from regional office to local offices, as needed, for optimizing the delivery of mail elements and packages being managed by delivery management system 100.

As additional illustrative examples, the engine 118 may optimize delivery of a mail element or package based on one or more of: delivery route optimization, delivery vehicle characteristic optimization, sorting crew work shift optimization, delivery vehicle driver work shift optimization, minimization of postal worker hours, maximization of postal worker route delivery hours, delivery distance optimization, delivery time optimization, delivery route fuel usage optimization, time of day optimization, traffic optimization, network carbon footprint optimization, total network cost optimization, and mail element or package condition optimization, or any weighted combination of the aforementioned factors.

The optimization may take into account constraints in the delivery network such as labor capacity, facility capacity, and vehicle capacity. The optimization may further take into account delivery time requirements, as in the case of same-day deliveries, next-day deliveries or deliveries guaranteed before a certain time. In one embodiment, delivery route optimization may include consolidating all deliveries to one side of a highway together; it may also include consolidating all deliveries requiring only right turns by the delivery vehicle to be made together. In one embodiment, delivery vehicle characteristic optimization may include assigning the smallest delivery vehicle required for the group of mail elements and packages to be delivered along a given route. In one embodiment, delivery vehicle characteristic optimization may include assigning the delivery vehicle that includes a lift needed for delivering a heavy mail element or package. In one embodiment, sorting crew work shift optimization includes sorting mail elements and packages such as to avoid or limit overtime paid to sorting crews. In one embodiment, delivery vehicle driver work shift optimization includes sorting mail elements and packages such as to avoid or minimize overtime paid to delivery vehicle drivers. In one embodiment, time of day optimization includes picking a route based on the time of day to minimize traffic delays; in another embodiment, time of day optimization includes picking a delivery time for a delivery requiring signature such that the likelihood of a person available at the delivery destination for signing receipt of mail element or package is high.

In one embodiment, after completing the route optimization analysis, the delivery management server 110 may direct an automated or robotic machine to transport the mail element or package to a mail element or package outlet or a mail element or package collecting device corresponding to the destinations of the mail element or package, as determined by the delivery management system 100 as described herein.

In operation, the delivery management system 100 may cross check a scanned image (i.e., address) present on the mail element or package against street addresses within all zip codes that form a predefined area comprising local market 212. In one embodiment, the delivery management system may cross check a scanned image (i.e., address) present on the mail element or package against street addresses within a predefined geographical area that forms local market 212. In one embodiment, the delivery management server includes a database of several local market areas, each market area including a plurality of street addresses, for use by the delivery management system.

In some embodiments, the delivery management system may acquire various details regarding the mail element or package using a mail element or package information acquisition device (not shown). In one embodiment, the device may "read" destination address information code present on the mail element or package via a scanner, wherein the scanner is configured to scan the information code for obtaining the destination of the mail element or package to be sorted. For example, the mail element or package to be sorted is provided thereon with information code such as a bar code, a two-dimensional code, a radio frequency (RF) tag, a QR code, etc., and correspondingly, the mail element or package information acquisition device may be a bar code scanner, a two-dimensional code scanner, a radio frequency identifier, etc. In some embodiments, in addition to the destination, the delivery management system 100 may further capture additional information about the mail element or package volume, weight etc., and correspondingly, the mail element or package information acquisition device may further include a weighing device, a volume scanner, etc. In order to improve the efficiency of subsequent sorting, preferably, after various details regarding the mail element or package is obtained by the system 100, it may perform a complete analytical processing of the obtained mail element or package information, thereby obtaining the destination information of the mail element or package to be sorted. For example, the system 100 may interact with the information acquisition device so as to obtain the mail element or package information acquired by the mail element or package information acquisition device, to obtain the destinations of the respective mail element or packages to be sorted.

After obtaining the parcel information, in order to improve the efficiency of the subsequent sorting processes, the system 100 may further include a plurality of automated or robotic machines, wherein the plurality of automated or robotic machines are in connection with the system 100. Delivery management server 110 may be configured to control, according to the obtained destinations of the mail element or package to be sorted, at least one of the automated or robotic machines to transport the mail element or package to be sorted to a mail element or package outlet or a mail element or package collecting device corresponding to the destination of the mail element or package being sorted, as determined by the delivery management system 100 as described herein.

In one embodiment, the delivery management server 100 includes a database of several local markets 212, each local market 212 including a plurality of zip codes, for use by the delivery management system. In one embodiment, the delivery management system 100 and/or the delivery management server 110 is supplied with a relational database listing various sets of features to be considered by a real time optimization algorithm operating on the delivery management server and/or on the parcel sequencing engine for purposes of optimizing delivery of mail elements and packages. The relational database may include information such as delivery preferences for each delivery locations within a local market 120, preferences associated with each mail element or package type, preferences associated with traffic flow patterns, preferences associated with time of day and day of week that impact mail element or package delivery efficiencies, preferences associated various delivery vehicles, preferences associated with various zip codes, preferences associated with various vendors supplying the mail elements and packages for delivery, preferences associated with prepped food delivery vendors, preferences associated with fresh produce vendors, and similar other information for optimizing resources associated with delivery of a mail element or package while simultaneously maximizing customer satisfaction based on factors such as customer preferences and value, condition of the mail element or package, contents of the mail element or package to be delivered, and similar other factors.

While the disclosure is being described with respect to sorting operations in a post office or a local office setting, the disclosure can be advantageously used in several other applications involving delivery of tangible goods. In one embodiment, the sorting operations performed to determine whether or not to ship a received item to a central processing or sorting facility may be coupled to or associated with a dairy farm operation. In other embodiment, the sorting operations may be associated with an egg farm operation. In another embodiment, the sorting operations may be associated with an organic farming operation. In another embodiment, the sorting operations may be associated with a system with a primary goal of minimizing the mileage traveled by a mail element or package or item from source to destination. In another embodiment, the sorting operations may be associated with a system with a primary goal of minimizing the time taken for transporting an item from source to destination. In another embodiment, the sorting operations may be associated with a system with a primary goal of maintaining the temperature of the item being shipped within acceptable limits during transport of the item from source to destination. In another embodiment, the sorting operation may be associated with delivery of prepped food items. In another embodiment, the sorting operations may be associated with a system optimized primarily to minimize damage to a fragile item during transport from source to destination.

According to one embodiment, the imaging of the destination address or identifier of the mail element or package is compared with a database that corresponds to the plurality of post offices located both inside and outside the local market.

According to one embodiment, wherein the destination post office is the post office in which the determination is made, the server 110 is configured to direct any mail element or package originating from and is to be delivered via the same singular post office to be sorted by the automated or robotic system to the destination within the automated or robotic sortation system that collects the mail elements or packages to be processed by this singular post office.

In one embodiment, the server 110 (or alternately the parcel sequencing engine 118) makes the route determination based factors such as delivery route optimization, delivery vehicle characteristic optimization, sorting crew work shift optimization, minimization of postal worker hours, maximization of postal worker delivery hours due to minimization or elimination of in postal facility sortation of mail elements and packages, delivery vehicle driver work shift optimization, delivery distance optimization, delivery time optimization, delivery route fuel usage optimization, time of day optimization, traffic optimization, network carbon footprint optimization, mail element or package condition optimization, total network cost optimization, or any weighted combination of the aforementioned factors.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A system comprising a server for use in directing a mail element or package delivery operation, the mail element or package delivery operation including the server, an information acquisition device, a database, and an automated robot, the server having a memory, a processor, and a parcel sequencing engine, the system configured for: receiving information identifying a mail element or package, wherein the received information is received from the information acquisition device that is communicatively coupled to the server, wherein the information identifying the mail element or package includes a destination address or identifier of the mail element or package that is read by the information acquisition device, and wherein the information identifying the mail element or package is compared with the database, wherein the database corresponds to a plurality of post offices; determining, by the server, if the destination address of the mail element or package is a location inside a local market or outside the local market, wherein the determination is based on the received information from the information acquisition device, and wherein the local market includes a plurality of post offices within a distance from a post office where the mail element or package initially arrives; making a route determination, by the parcel sequencing engine, to the destination address based on whether the destination address of the mail element or package is destined for a location inside the local market or outside the local market and based on one or more of delivery route optimization, delivery vehicle characteristic optimization, delivery vehicle driver work shift optimization, delivery route fuel usage optimization, or network carbon footprint optimization, and sending directions including the route determination, by the server, to the automated robot that is communicatively coupled to the server, wherein the route determination is executed by sorting the mail element or package with the automated robot in response to the directions from the server, wherein, when the mail element or package is destined for a location inside the local market, the directions direct transport of the mail element or package to a destination post office within the local market, and wherein, when the mail element or package is destined for a location outside the local market, the directions direct transport of the mail element or package to a regional center.

2. The server according to claim 1, wherein the local market is dynamically defined based on an optimization algorithm that reduces a volume of mail elements or packages being handled by the regional center based, at least in part, on demand for delivery of mail elements or packages.

3. The server according to claim 1, wherein the database further corresponds to a plurality of street addresses associated with the plurality of post offices.

4. The server according to claim 1, wherein the destination post office is the post office in which the determination is made.

5. The server according to claim 4, wherein when the mail element or package is destined for a location within the local market, the server is configured to: assign a route for delivery of the mail element or package based on the destination address for additional mail elements or packages.

6. The server according to claim 1, wherein the transport to the destination post office within the local market is made with a delivery vehicle.

7. The server according to claim 1, wherein the regional center services areas outside of the local market.

8. The server according to claim 1, wherein the parcel sequencing engine is configured to optimize a delivery sequence of the mail element or package relative to other mail elements or packages to be delivered along same delivery route.

9. The server according to claim 1, wherein, when the mail element or package is not located within the local market, the server is configured to identify at least one regional office and an intermediate postal office from the database that corresponds to the plurality of postal offices, wherein the identification of the at least one regional office and the intermediate postal office is based on the destination address of the mail element or package, wherein the intermediate postal office is positioned outside of the local market and is a first distance from the post office where the mail element or package initially arrives, wherein the at least one regional center is outside the local market and a second distance from the post office where the mail element or package initially arrives, wherein the first distance is less than the second distance, wherein the directions including the route determination include instructions to deliver the mail element or package to the intermediate postal office.

10. The server according to claim 1, wherein the database further includes staffing data and vehicle data corresponding to each postal office of the plurality of postal offices, wherein the staffing data includes a number of employees and employees schedules, wherein the vehicle data includes a capacity of delivery vehicles, wherein the parcel sequencing engine is further configured to make the determination based on a staffing level of the destination post office, wherein the parcel sequencing engine is further operable to make the determination based on the capacity level of the delivery vehicles.

11. The server according to claim 1, wherein the server is further configured to receive a volume of mail elements or packages for the plurality of postal offices, wherein the parcel sequencing engine is configured to determine at least one regional office for the route determination based on the volume of mail elements for the plurality of postal offices.

12. A method of directing a mail element or package delivery operation including a server, an information acquisition device, a database, and an automated robot, the server having a memory, a processor, and a parcel sequencing engine, the method comprising: receiving information identifying a mail element or package, wherein the received information is received from the information acquisition device that is communicatively coupled to the server, wherein the information identifying the mail element or package includes a destination address or identifier of the mail element or package that is read by the information acquisition device, and wherein the information identifying the mail element or package is compared with the database that corresponds to a plurality of post offices; determining, by the server, if the destination address of the mail element or package received at a first local office of a local market is destined for a location inside a local market or outside the local market, wherein the determination is based on the received information from the information acquisition device, and wherein the local market includes a plurality of local offices within a predefined distance from the first local office where the mail element or package initially arrives making a route determination, by the parcel sequencing engine, to the destination address based on whether the destination address of the mail element or package is destined for a location inside the local market or outside the local market and based on one or more of delivery route optimization, delivery vehicle characteristic optimization, delivery vehicle driver work shift optimization, delivery route fuel usage optimization, or network carbon footprint optimization, and sending directions including the route determination, by the server, to the automated robot that is communicatively coupled to the server, wherein the route determination is executed by sorting the mail element or package with the automated robot in response to the directions from the server, wherein, when the mail element or package is destined for a location inside the local market and the destination address is not served by the first local office of the local market that received the mail element or package, the server is operable to determine if a second local office of the plurality of local offices serves the destination address, wherein the server is further operable to send instructions to the automated robot to sort the mail element or package to a group of mail elements or packages destined for the second local office of the plurality of local offices, and wherein, when the mail element or package is destined for a location outside the local market, the directions direct transport of the mail element or package to a regional center.

13. The method according to claim 12, wherein the database that corresponds to the plurality of postal offices further includes a plurality of street addresses associated with the plurality of local offices.

14. The method according to claim 12, wherein when the mail element or package is destined for a location within the local market, the method further comprises: assigning a route for delivery of the mail element or package based on the destination address for additional mail items or package.

* * * * *